United States Patent [19]

Howard

[11] Patent Number: 5,784,213
[45] Date of Patent: Jul. 21, 1998

[54] BACKUP MIRROR FOR TOW VEHICLE

[76] Inventor: Gary Howard, 259 Dutton Ave., Sebastopol, Calif. 95472

[21] Appl. No.: 837,607

[22] Filed: Apr. 21, 1997

[51] Int. Cl.[6] .............................. G02B 7/182; B60R 1/06
[52] U.S. Cl. .................... 359/872; 359/881; 248/467; 248/479; 248/486; 33/264; 280/477
[58] Field of Search ..................... 359/868, 871, 359/872, 876, 879, 880, 881; 248/467, 477, 479, 484, 485, 486, 487, 488; 33/264; 280/477

[56] References Cited

U.S. PATENT DOCUMENTS

| | | | |
|---|---|---|---|
| D. 340,219 | 10/1993 | Moon | D12/187 |
| 4,905,376 | 3/1990 | Neeley | 33/264 |
| 4,925,287 | 5/1990 | Lord et al. | 248/467 |
| 4,951,913 | 8/1990 | Quesada | 248/485 |
| 5,111,342 | 5/1992 | Quesada | 359/872 |
| 5,313,337 | 5/1994 | Byers | 359/872 |
| 5,478,101 | 12/1995 | Roberson | 248/467 |
| 5,482,310 | 1/1996 | Staggs | 359/881 |
| 5,550,681 | 8/1996 | Mazarac | 359/881 |
| 5,657,175 | 8/1997 | Brewington | 359/872 |

*Primary Examiner*—Ricky D. Shafer
*Attorney, Agent, or Firm*—Larry D. Johnson

[57] ABSTRACT

An accessory mirror apparatus that can be mounted on the tailgate, trunk, rear window or other part of a tow vehicle, and oriented to enable the driver of the tow vehicle to see a reflection of the trailer tongue in the mirror while backing up. The apparatus includes a convex mirror rotatably mounted in a bracket. The bracket extends downwardly from the mirror in a pair of elongate leg portions, each of which includes a lockable hinge member which enables the leg portion to be folded. Each leg portion extends downwardly to a first U-shaped bend, then upwardly to a second U-shaped bend, such that the combination of the first and second bends provides a hook member for hanging on tailgates. Each leg portion terminates in a suction cup member to be used for installation on other vehicle applications.

3 Claims, 5 Drawing Sheets

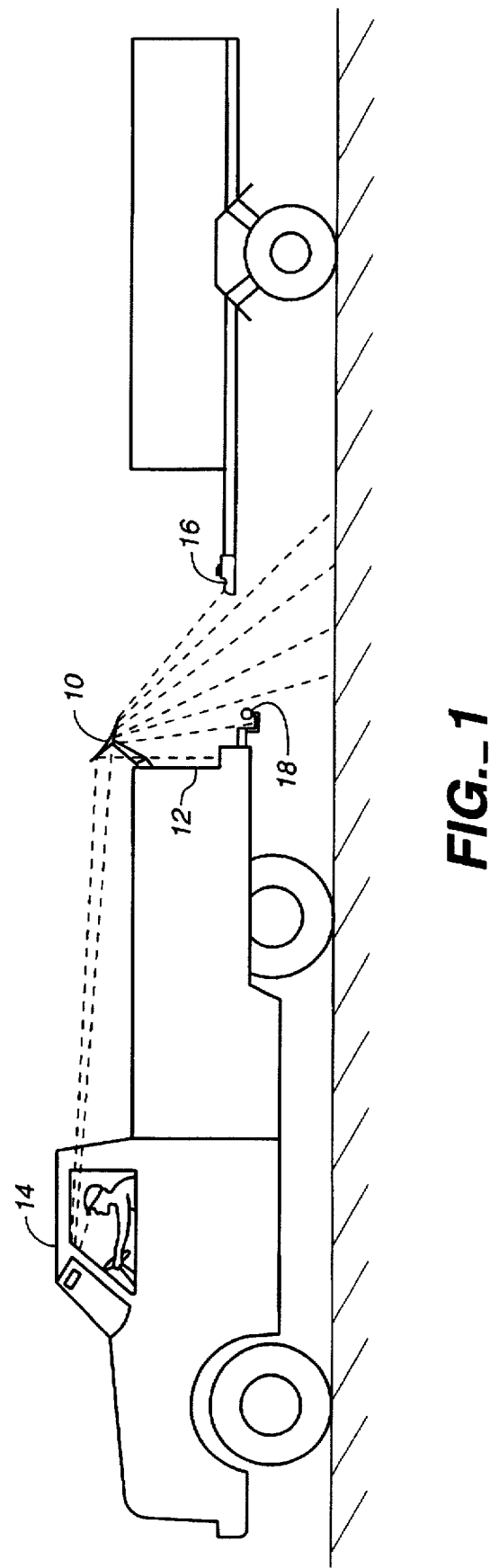
FIG._1

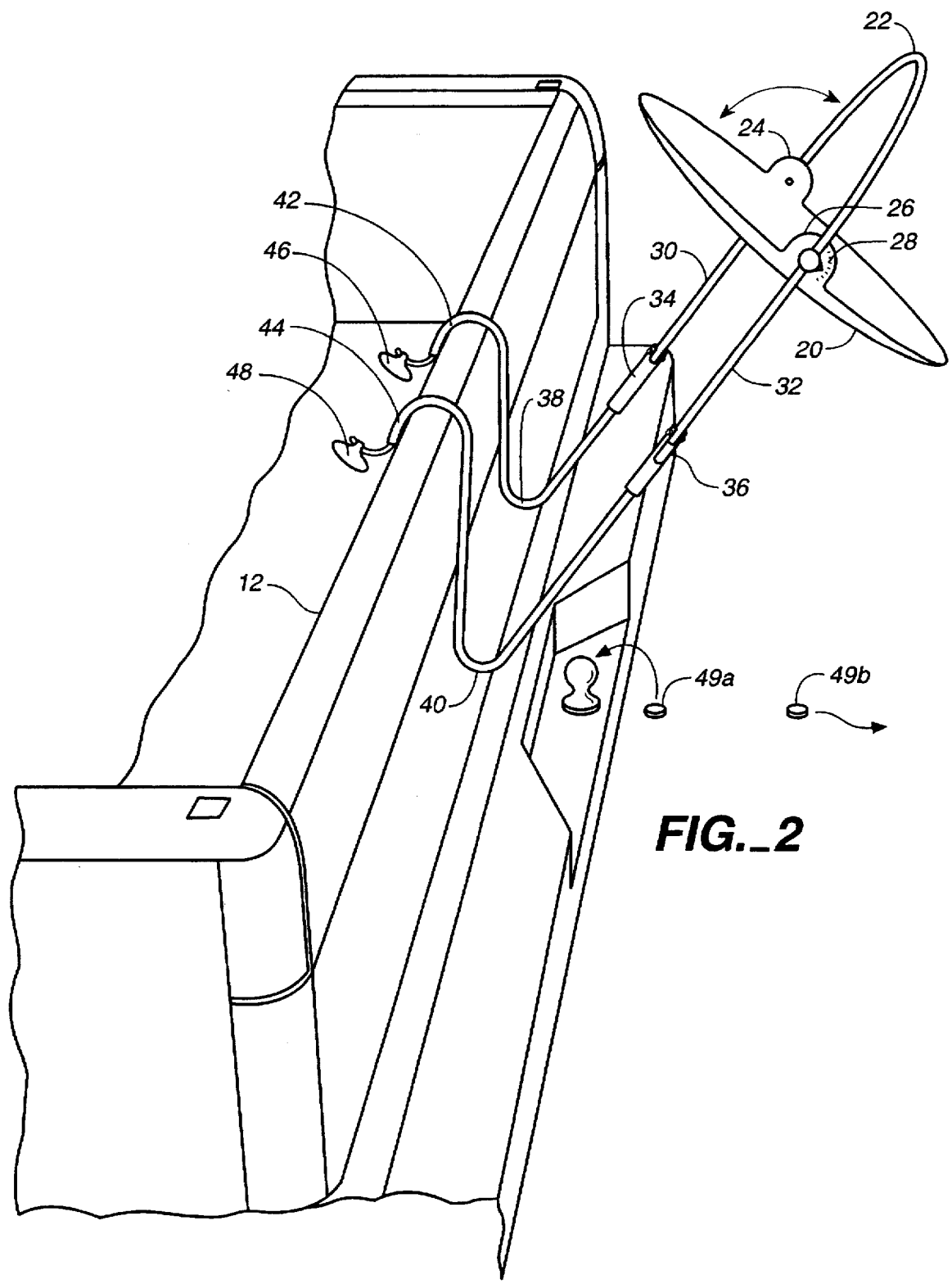
FIG._2

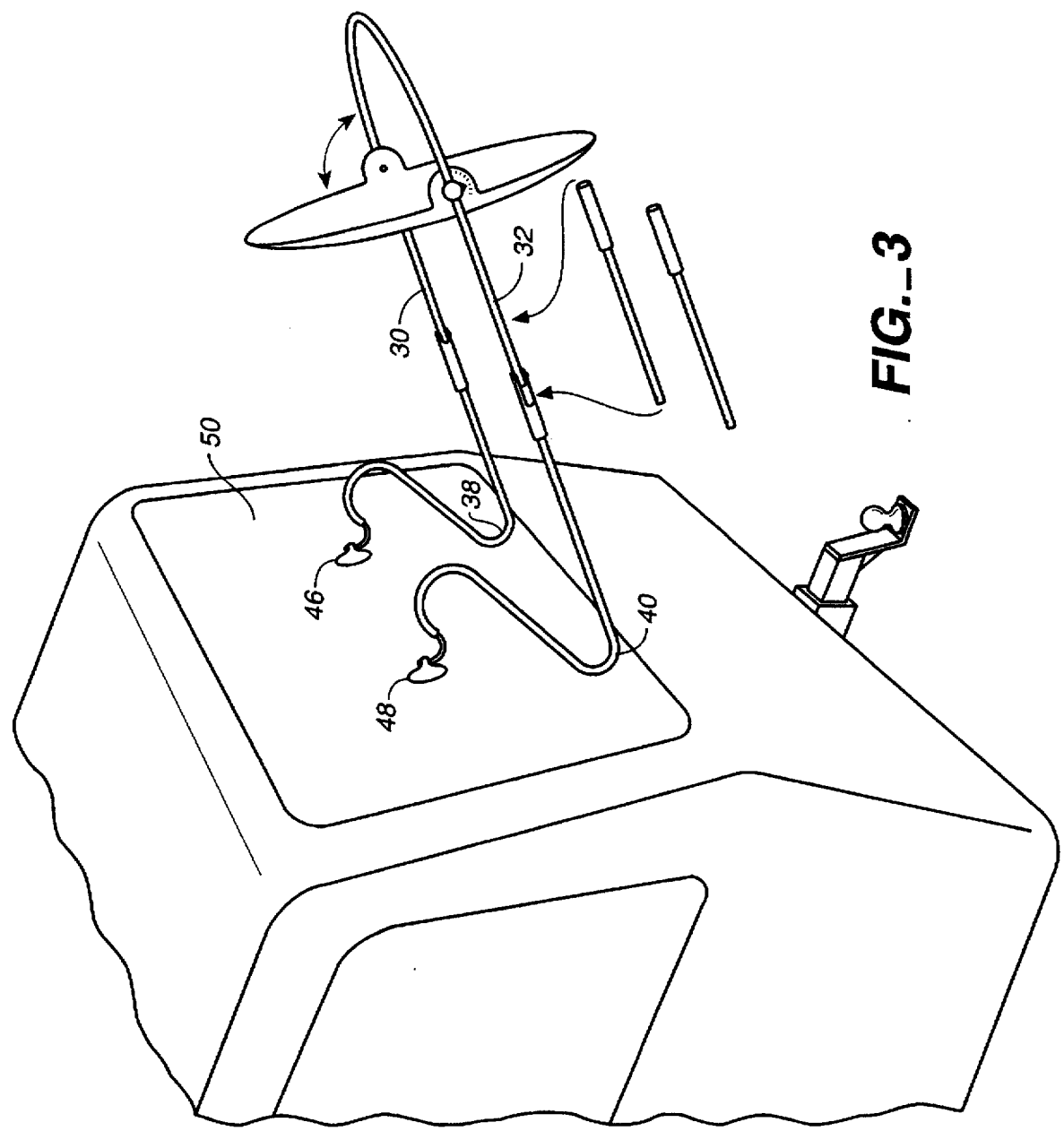
FIG._3

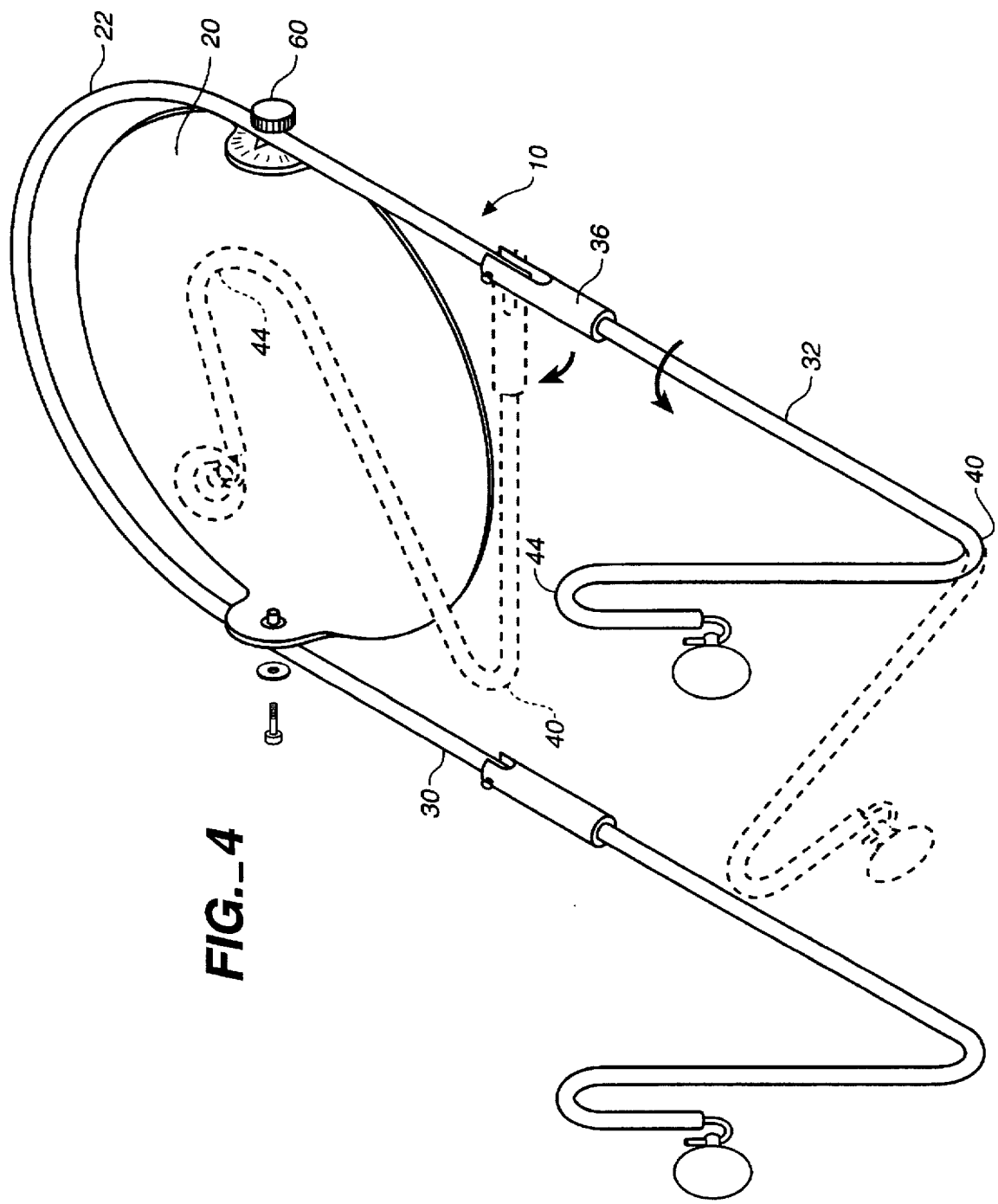
FIG._4

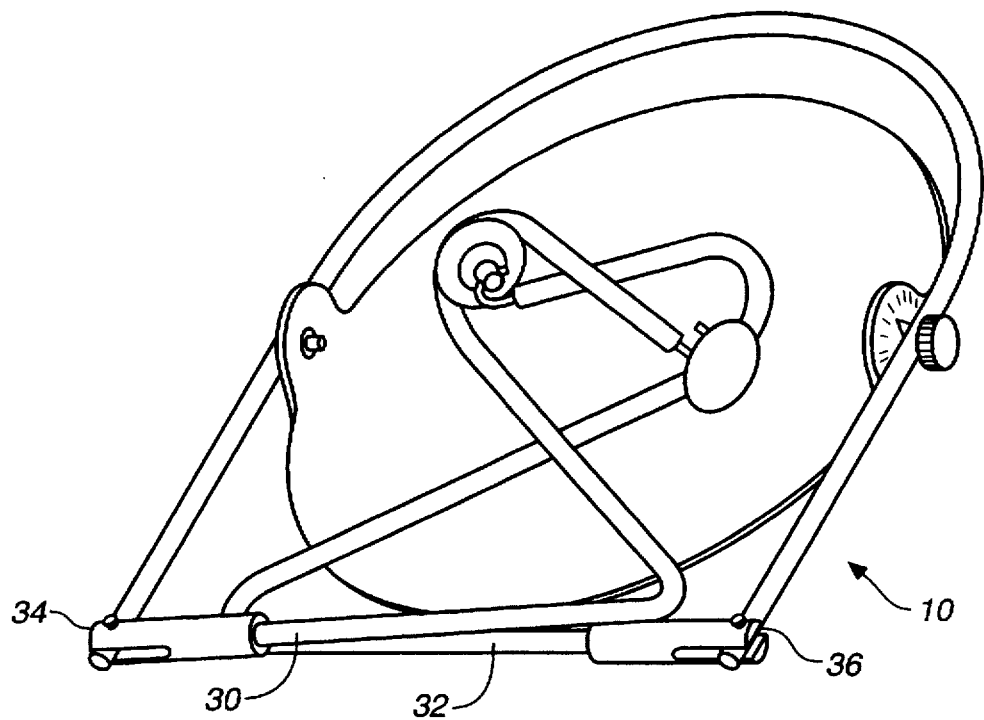
FIG._5

BACKUP MIRROR FOR TOW VEHICLE

BACKGROUND OF THE INVENTION

1. Field of the Invention

This invention relates generally to tow vehicles, trailers, and accessories therefore, and more specifically to an improved backup mirror apparatus enabling viewing of a trailer tongue while backing up.

2. Description of the Prior Art

It is often difficult to drive a tow vehicle into alignment with a trailer so that the two can be connected together, especially if the driver of the tow vehicle is unassisted. Several mirror devices have been designed in an attempt to provide the unassisted tow vehicle driver with a view of the trailer. However, known examples of these devices are problematic, in that they are awkward to use, difficult to adjust, and/or lack versatility.

SUMMARY OF THE INVENTION

The invention provides an accessory mirror apparatus that can be mounted on the tailgate, trunk, rear window or other part of a tow vehicle, and oriented to enable the driver of the tow vehicle to see a reflection of the trailer tongue in the mirror while backing up. This permits the driver to steer the tow vehicle so that the towing ball on the vehicle, and the tongue of the trailer are brought into alignment, without the need for outside assistance.

The inventive apparatus includes a generally convex mirror rotatably mounted in a bracket at first and second tabs, with numbered markings on the tabs to permit selective positioning of the mirror to a predetermined orientation within the bracket. The bracket extends downwardly from the mirror in a pair of elongate leg portions, each of which includes a lockable hinge member which enables the leg portion to be folded at a point along its length for compactness in storage. Each leg portion then extends further downwardly to a first U-shaped bend, then upwardly to a second U-shaped bend, such that the combination of the first and second bends on each leg portion provides a hook member adapted for hanging on tailgates and the like. Finally, each leg portion terminates in a suction cup member to be used for installation on other vehicle applications, as described.

This invention works on trucks (with or without campershells), RV's, multi-purpose vehicles and most cars capable of towing. It works day or night (an accessory flashlight mounted on the mirror or other surface may be necessary if the towing vehicle's backup lights aren't bright enough). The tongue of the trailer is visible when the user is as much as approximately three feet away (from tow ball to trailer tongue). Magnetic reflective markers may be placed on the ball and tongue to make night-time hookup even easier.

BRIEF DESCRIPTION OF THE DRAWINGS

FIG. 1 is a pictorial view of a backup mirror of this invention as installed on the tailgate of a tow vehicle, to enable viewing of a trailer tongue when backing up;

FIG. 2 is a perspective view of a backup mirror of this invention as installed on a tailgate of a tow vehicle;

FIG. 3 is a perspective view of a backup mirror of this invention as installed on a rear window of a tow vehicle;

FIG. 4 is a perspective view of a backup mirror of this invention in a partially collapsed (storage) configuration; and FIG. 5 is a perspective view of the backup mirror of FIG. 4 in its fully collapsed configuration.

DETAILED DESCRIPTION OF A PREFERRED EMBODIMENT

FIG. 1 is a pictorial view of a backup mirror 10 as installed on the tailgate 12 of a tow vehicle 14 to enable viewing of a trailer tongue 16 when backing up. Backup mirror 10 provides a view of the trailer tongue 16 when it is within several feet of the tow ball 18.

FIG. 2 is a perspective view of a backup mirror 10 as installed on a tailgate 12. Apparatus 10 includes generally convex mirror 20 rotatably mounted in a bracket 22 at first and second tabs 24, 26. Numbered markings 28 on the tabs permit selective positioning of the mirror 20 to a predetermined orientation within the bracket 22, as described herein.

Bracket 22 extends downwardly from the mirror 20 in a pair of elongate leg portions 30, 32. Each leg portion includes a lockable hinge member 34, 36, which enables the leg portion to be folded at a point along its length for compactness in storage. Each leg portion then extends further downwardly to a first U-shaped bend 38, 40, then upwardly to a second U-shaped bend 42, 44, such that the combination of the first and second bends on each leg portion provides a hook member adapted for hanging on tailgates and the like. Finally, each leg portion terminates in a suction cup member 46, 48, to be used for installation on other vehicle applications (described infra). This view also illustrates the reflective magnets 49a, b which may be affixed to the tow ball and trailer tongue for night viewing, as described herein.

FIG. 3 is a perspective view of the backup mirror 10, this time installed on a rear window 50 of a van-type vehicle. In this application, suction cups 46, 48 are releasably affixed to the window 50, such that first U-shaped bends 38, 40 contact the window and support the mirror in the desired orientation. This view also illustrates extension arms that may be added to the leg portions 30, 32, if additional length is needed (e.g., to extend beyond a spare tire or other article).

FIG. 4 is a perspective view of a backup mirror apparatus 10 of this invention in its partially collapsed configuration for storage. Here, second leg portion 32 dual purpose hinge 36 is shown first being rotated ninety degrees about the longitudinal axis of the leg portion, then folded ninety degrees so that first and second U-shaped bends 40, 44 are brought into juxtaposition with mirror 20 and the remainder of bracket 22. The leg portions 30, 32 may be covered with soft rubber, plastic, foam or other material to prevent damage to the vehicle. Adjustment knob 60 may be utilized to affix the mirror to the bracket at tabs 24, 26.

FIG. 5 is a perspective view of the backup mirror 10 of FIG. 4, now in its fully collapsed configuration. In this view, both leg portions 30, 32 have been rotated and folded at hinge portions 34, 36, respectively, to bring the entire apparatus into a compact, easily stored package.

Instructions for use of the apparatus may include the following:

The user should check the trailer tongue and verify that it is higher above ground than the hitch ball so that the hitch ball can be safely backed underneath it.

To mount the backup mirror apparatus on the vehicle, the apparatus should be unfolded and mounted on the center of the vehicle over the hitch ball, or as close to the center as possible. The apparatus will not be visible if the view is blocked by cargo in the vehicle.

Improper mounting or mounting on a dirty or wet surface could cause the apparatus to fall. If the surface is dirty, it should be cleaned, or if it is wet, excess moisture should be wiped off before applying the suction cups. Before letting go of the apparatus, the user should pull back on it to verify that it is firmly attached to the mounting surface. When folding or unfolding the mounting arms the user needs to be careful not to pinch their fingers.

The vehicle setting number should be established. Once the apparatus is mounted on the vehicle, the knob can be loosened and the mirror adjusted. When rotating the mirror, the user should make sure the knob is loose enough to allow the mirror to rotate easily. The mirror should be adjusted so that the hitch ball appears near the edge in the upper quadrant to the convex mirror when looking back from the driving position in either the rear-view mirror or over the user's shoulder. This will provide the widest possible view. Beneath the knob is a pointer which points to a series of numbers. This number can be recorded in the space provided on the back of the mirror with a permanent marker for each vehicle on which the mirror will be used.

The next time the apparatus is mounted on a particular vehicle, the user must mount the mirror in the same spot on the vehicle in order for this number setting he's recorded to work.

If the apparatus is hung on a tailgate, it will naturally be in the same spot every time. But if the apparatus is attached to a rear window or on the trunk of a car, the user must establish a reference point to refer to each time he mounts the mirror. For example, the suction cups should be aligned with a specific defrost line encased in the glass window; the top of the window; the bottom of the window; a particular edge of a body contour, such as the outer edge of the lid of a car's trunk; or some other recognizable point on the vehicle.

The vehicle should be slowly backed toward the center of the trailer. To avoid damage to the vehicle or trailer, the user should keep their eyes on the mirror while backing up. The trailer tongue will come into view in the lower edge of the mirror when the user is three to six feet away from the tongue. This distance will vary depending on how high above the ground the mirror is when mounted on the vehicle. A higher mounting position gives the user a wider view. The user should continue backing slowly until the tongue just covers the hitch ball. The user has now precisely aligned the vehicle and can lower his trailer onto the hitch ball.

To store the apparatus, it should be folded and put in its protective bag and stored in the vehicle in a place where it won't be damaged. The apparatus should not be dropped, or set down on the mirror's surface. The convex mirror could break or scratch if handled improperly.

Nighttime use of the mirror: Two reflective magnets are supplied. One should be placed on top of the hitch ball and one on the tip of the trailer tongue. When backing up the user will see two white dots, and should align them. Backup lights and license plate lights must work in order to illuminate the magnets. On cold evenings or when windows have a tendency to fog, the user should be sure to back the vehicle promptly after mounting the apparatus so that the mirror doesn't have time to fog.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An accessory mirror apparatus for mounting on a tow vehicle, and oriented to enable the driver of the tow vehicle to see a reflection of the trailer tongue in the mirror while backing up, said apparatus comprising:

a generally convex mirror portion rotatably mounted in a bracket member at first and second tab elements, said bracket extending downwardly from said mirror portion in a pair of elongate leg portions, each of said leg portions includes a lockable hinge member enabling each of said leg portions to be folded at a point along its length, each of said leg portions extending further downwardly to a first U-shaped bend, then upwardly to a second U-shaped bend, such that the combination of said first and second U-shaped bends on each of said leg portions provides a hook member adapted for hanging on a vehicle tailgate.

2. The accessory mirror apparatus of claim 1 wherein each of said leg portions terminates in a suction cup member adapted for releasable connection to said vehicle.

3. The accessory mirror apparatus of claim 1 wherein said lockable hinge member enables each of said leg portions to be folded and rotated at said point along its length for compactness in storage.

* * * * *